Aug. 28, 1962 J. W. CONSOLLOY 3,051,514
CONNECTING MEANS HAVING A CAM OPERATED SPLIT
CONTRACTIBLE SLEEVE
Filed March 13, 1958

INVENTOR.
JAMES W. CONSOLLOY
BY
*Edward J. Dreyer*
ATTORNEY

United States Patent Office 3,051,514
Patented Aug. 28, 1962

3,051,514
CONNECTING MEANS HAVING A CAM OPERATED SPLIT CONTRACTIBLE SLEEVE
James W. Consolloy, Pennington, N.J., assignor to The Electric Storage Battery Company, a corporation of New Jersey
Filed Mar. 13, 1958, Ser. No. 721,130
2 Claims. (Cl. 285—215)

The present invention generally relates to connecting means. More specifically, the present invention relates to connecting means for pipes, rods, electrical conductors or other members having cylindrical cross sections.

A general object of the present invention is to provide a new and improved connecting means characterized by simplicity of construction and ease of operation.

A more specific object of the present invention is to provide a connecting means adapted to furnish a mechanically strong connection without the use of bolts or threads.

Another object of the present invention is to provide a connecting means which can be quickly operated to clamp or unclamp a cylindrical member placed therein.

Still another object of the present invention is to provide a new and improved connecting means operable through a simple turning action to clamp and hold a cylindrical member placed therein.

A further object of the present invention is to provide a new and improved connecting means which is adapted for use as a pipe coupling and which will furnish both a mechanically strong and a fluid tight coupling between the pipe sections to be joined.

A still further object of the present invention is to provide a pipe coupling in which a simple turning operation not only securely clamps the pipe in the coupling but also compresses a gasket around the pipe to provide a positive liquid tight seal.

These and other objects of the present invention are accomplished by means of novel structure which comprises a socket adapted to receive internally the cylindrical member being connected and a split frustro-conical sleeve which is adapted to turn in a frustro-conical recess formed in the internal surface of the socket. When the sleeve is turned, it is drawn against the socket through the action of cammed surfaces on the sleeve and in the socket, and compressed around the member within, clamping it in the socket. When utilized as a pipe coupling, the clamping action of the sleeve combines with the sealing action of an annular gasket in the internal surface of the socket to provide a mechanically strong and fluid tight coupling.

A better understanding of the present invention may be had from the following description read with reference to the accompanying drawings of which:

Figure 1:
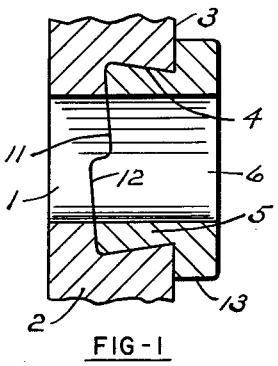
FIG. 1 is a sectional side elevation of an embodiment of the present invention adapted to connect a cylindrical member to a wall or other surface.
Figure 2:
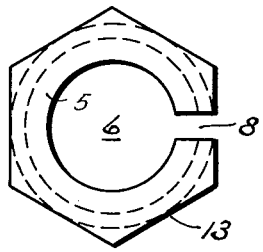
FIG. 2 is an end elevation of the embodiment of the present invention shown in FIG. 1.
Figure 5:
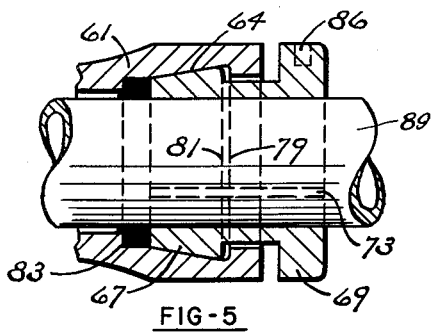
FIG. 5 is a partial sectional side elevation of the pipe coupling shown in FIG. 4 as applied in use.

Referring now to FIGS. 1 and 2, the numeral 1 designates a socket comprising a cylindrical bore molded or cut in a wall 2 of an electrical housing or other similar construction to which it is desired to connect a member of cylindrical cross section, such as a pipe 89, shown in FIG. 5, rod or electrical conductor. As shown, the socket 1 is adapted to allow the member being coupled to pass completely through the wall 2. It should be noted, however, that, were this not desirable, the socket 1 need only extend into the wall 2, a distance sufficient to incorporate the structure hereinafter described. A frustro-conical recess or counter bore 4 extends inward from the surface 3 of the wall 2 tapering away from the socket 1. The recess 4 houses a frustro-conical sleeve 5, having a cylindrical bore 6, adapted to receive internally the cylindrical member to be connected to the wall 2.

The sleeve 5 like the socket 1, may be made of plastic or other suitable material. In practice, it has been found desirable to mold the socket 1 around the sleeve 5. However, since the sleeve 5 is adapted to rotate in the socket 1, suitable parting agent or other means must be employed to prevent the adherence of the parts during the molding.

As shown in FIG. 2, the sleeve 5 is split along its length at 8 which permits the interior bore 6 of the sleeve 5 to be reduced in size as the sleeve 5 is rotated in a clockwise direction, by the cammed surface 11 provided on the surface of the frustro-conical recess 4 where it abuts the end of the sleeve 5. The end of the sleeve 5 is provided with a similar cammed surface 12 adapted to co-act with the cammed surface 11. The pitch of said mating cammed surface is low and below the angle of repose of the sleeve 5 in the recess or counter bore 4. The pitch of the cammed surfaces 11 and 12 is such that as the sleeve 5 is rotated in a clockwise direction, it is forced outward from the socket 1. Because of the frustro-conical shape of the sleeve 5 and the recess 4, the sleeve 5 is drawn against the recess 4 as it is forced outward from the socket 1. This compresses the split 8 and reduces the interior bore 6 of the sleeve 5. In this manner, a clamping action is exerted upon a member positioned in the sleeve 5. In order to facilitate the turning of the sleeve 5 sufficiently to achieve the desired degree of clamping, the sleeve 5 is provided with a hexagonal shoulder 13 adapted to be gripped by a wrench or other suitable turning means. To release the member clamped within the sleeve 5, the sleeve is rotated in the opposite direction, thus relieving the compression of sleeve 5 and drawing it back into the socket 1.

It will be obvious to one skilled in the art that the pitch of the cammed surfaces 11 and 12 may be so chosen that the clamping action described hereinbefore may be achieved by turning the sleeve either in a clockwise or counter clockwise direction, depending upon the direction chosen for the pitch. Since the amount by which the bore 6 of the sleeve 5 can be reduced and is limited both by the construction of the sleeve 5 and socket 1 and by the elasticity of the sleeve 5, it is desirable that the diameter of the cylindrical member to be clamped be such that the member substantially fills the bore 6 when the sleeve 5 is uncompressed. Where it is desired to utilize this connecting means for members having diameters substantially less than the bore 6, suitable packing means may be utilized to surround the member in the socket. Since this connecting means is readily operable to securely clamp a cylindrical member placed therein by means of a quick turning action, it is adapted for many uses. For example, it could be employed to connect an electrical conductor or a bundle of electrical conductors to an electrical housing, or to connect a pipe or rod to a wall, to mention but a few of its many uses.

Figure 3:
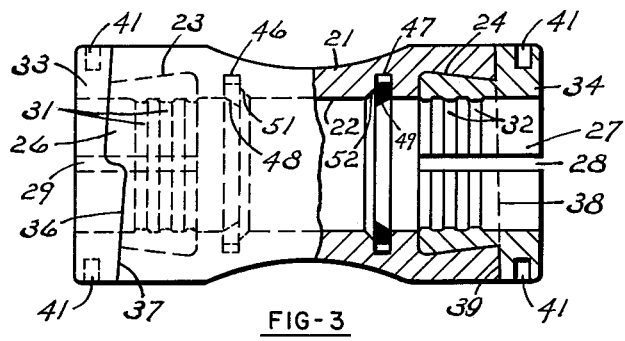
FIG. 3 is a side elevation, drawn in partial section, of an embodiment of the present invention utilized as a pipe coupling.

Referring now to FIG. 3, there is shown an embodiment of the present invention utilized as a pipe coupling. The numeral 21 designates a tubular socket having a cylindrical bore 22 adapted to receive the ends of the pipes or rods to be coupled. From the ends of the socket 21, frustro-conical recesses 23 and 24 taper away from the cylindrical bore 22. The recesses 23 and 24 house the rotatable split frustro-conical sleeves 26 and 27 respectively. Like the socket 21, the sleeves 26 and 27 have cylindrical bores and thus each is adapted to receive internally one of the pipes or rods to be joined.

The sleeves 26 and 27 and the socket 21 may be made of plastic or other suitable material with the socket being molded or cast around the sleeve. Since the sleeves 26 and 27 are adapted to rotate in the socket 21, a suitable parting agent or other means must be employed to prevent the adherence of the parts during molding.

As shown, the sleeves 26 and 27 are split along their lengths at 28 and 29 respectively. In addition, the sleeves 26 and 27 may have a plurality of annular ridges 31 and 32 respectively on their interior surfaces for gripping the pipes to be coupled. The sleeves 26 and 27 have shoulders 33 and 34 respectively which abut against the ends of the socket 21. The abutting edges of the shoulder 33 and the end of the socket 21 are provided with cammed surfaces 36 and 37 respectively. Similarly, the abutting edges of the shoulder 34 and the end of the socket 21 are provided with cammed surfaces 38 and 39 respectively. The pitch of these cammed surfaces is such that as the sleeves 26 and 27 are rotated in a clockwise direction, they are drawn outward from the socket 21. Due to the frustro-conical surfaces of the recesses 23 and 24 and the frustro-conical shapes of the sleeves 26 and 27, the sleeves 26 and 27 compress as they are drawn outward from the socket 21, reducing in dimension the splits 28 and 29 whereby the interior bores of the sleeves are reduced in diameter so as to grip the pipes placed therein. The clamping action thus obtained, insures that the pipes to be joined are securely locked in the coupling. In order to facilitate the turning of the sleeves 26 and 27 sufficiently to achieve the desired degree of clamping, the sleeves 26 and 27 have a plurality of recesses 41 which are adapted to receive the stud on a spanner wrench.

To provide a fluid tight coupling between the pipes to be joined, the bore 22 is formed with grooves 46 and 47 which house annular gaskets 48 and 49. As shown, each of the gaskets 48 and 49, which may be made of soft rubber or other suitable material, has a substantially saw toothed cross section, toward the end of the socket 21. The internal diameters of these gaskets are slightly smaller than the internal diameter of the socket 21. Accordingly, these ribs are deformed when pipes are introduced into the socket 21. To accommodate the deformation of the gaskets 48 and 49, annular grooves 51 and 52 have been provided adjacent to the gaskets 48 and 49. When deformed, the gaskets 48 and 49 form a liquid tight seal between the socket 21 and the pipes being joined.

It will be obvious to those skilled in the art that other gasketing means may be utilized to provide the desired liquid tight seal. It should be noted, however, that the sleeves 26 and 27 cooperate with the gaskets 48 and 49 in perfecting the aforementioned liquid tight seal. This cooperation is due in part to the clamping action provided by the sleeves 26 and 27 which prevents movement of the pipes in the coupling. In addition, when the sleeves 26 and 27 are tightened around the pipe being joined, the pipes are drawn slightly outward from the socket 21 causing the deformed gaskets 46 and 47 to be wedged between the pipes and the socket 21.

The degree of clamping obtained with the present invention is proportional to the rotation of the sleeves 26 and 27 with respect to the socket 21. In applications where extremely high pressures are encountered, grooves corresponding to the annular ridges 31 and 32 on the bores of the sleeves 26 and 27 may be provided on the pipes or tubing to be used with the coupling. When such grooves are provided, the annular ridges 31 and 32 will mate therewith, insuring an extremely strong union between the coupling and the pipes.

As in the case of the connecting means shown in FIGS. 1 and 2, pipes or rods placed in the coupling of FIG. 3 may be released by rotating the sleeves 26 and 27 in the direction opposite to that employed to connect the pipes therein. In this respect, it should be noted that the cammed surfaces on the sleeves 26 and 27 and on the socket 21 may be adapted to effect the clamping action when turned in either a clockwise or counter clockwise direction depending on the direction of the pitch chosen. Accordingly, it will be apparent to those skilled in the art, that the connecting means shown in FIG. 3 may be adapted for use as a pipe coupling, a union, or an expansion joint by the proper choice and combination of pitch directions.

Figure 4:
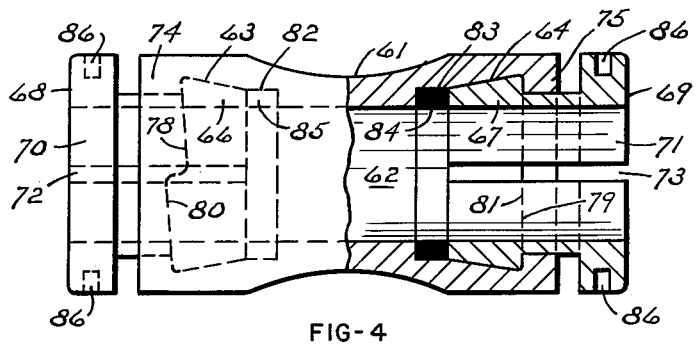
FIG. 4 is a side elevation, drawn in partial section, of a modification of the pipe coupling as shown in FIG. 3.

Referring now to FIGS. 4 and 5, there is shown a modification of the present invention in which gaskets are compressed around the pipes being coupled by the clamping action. The numeral 61 designates a tubular socket of molded plastic or other suitable material having a cylindrical bore 62 adapted to receive the pipes or rods to be coupled. A pair of frustro-conical recesses 63 and 64 taper away from the cylindrical bore 62 but in the opposite direction from the taper of the recesses 23 and 24 in the coupling shown in FIG. 3. The recesses 63 and 64 house the frustro-conical portions 66 and 67 of the split sleeves 68 and 69 respectively. Like the socket 61, the sleeves 68 and 69 have cylindrical bores 70 and 71 and thus, each is adapted to receive internally one of the pipes or rods to be joined.

The sleeves 68 and 69, which are adapted to rotate in the socket 61, are split along their length at 72 and 73 respectively. To retain the sleeves 68 and 69 in the recesses 63 and 64, the socket 61 is provided with collars 74 and 75 which surround the sleeves at their narrow portions. The inner surfaces of the collars 74 and 75 and the abutting surfaces of the frustro-conical portions 66 and 67 are provided with cammed surfaces 78, 79, 80 and 81 respectively. The pitch of these cammed surfaces is such that as the sleeves 68 and 69 are rotated in the socket 61, they are forced inward against the frustro-conical recesses 63 and 64. This compresses the sleeves 68 and 69 by reducing the width of the splits 72 and 73 thus, reducing the bore of the sleeves and clamping the pipes placed therein. In order to facilitate the turning of the sleeves 68 and 69 sufficiently to achieve the desired degree of clamping the sleeves are provided with recesses 86 which are adapted to receive a stud on a spanner wrench. It should be noted, however, that other suitable means, such as the construction shown in FIGS. 1 and 2, may be provided to facilitate the turning of the sleeves 68 and 69.

To provide for a liquid tight seal between the socket 61 and the pipes being joined, socket 61 is provided with grooves 82 and 83 adjacent to the frustro-conical recesses 63 and 64 respectively. These grooves house annular gaskets 84 and 85 which may be made of soft rubber or other gasket material. As shown in FIG. 5, when the sleeves 68 and 69 are forced inward by turning, the gaskets 84 and 85 are deformed and wedged around the pipes placed in the coupling. In this manner, the coupling of the present invention is particularly adapted to provide a positive liquid tight seal. As in the case of the pipe coupling shown in FIG. 3, the pitch of the cammed surfaces 78, 79, 80 and 81 can be chosen so as to achieve the clamping and sealing action with either a left or right hand turn. Accordingly, this coupling action may also be adapted for use as a union or expansion joint.

It will be apparent to those skilled in the art that certain modifications can be made in the embodiment of the present invention as it has been described without departing from the spirit of the invention. For example, the cammed surfaces may be placed on different abutting surfaces than those shown. Thus, in FIG. 3, the cammed surfaces may be placed on the sleeves 26 and 27 and the socket 21 at the base of the sleeves where they abut the socket, rather than on the shoulder of the sleeves and at the end of the socket as shown. With respect to the coupling of FIGS. 4 and 5, the bores of the sleeves 68 and 69 may be provided with ridges for gripping the pipes to be coupled. From the foregoing, however, it is apparent that the connecting means of the present invention has accomplished the objects recited hereinbefore, namely, to provide a non-complex connecting means quickly operably by means of a simple turning action.

Having now described this invention, that which is claimed is:

1. A connecting means for a cylindrical member, comprising in combination a socket having an axial bore therethrough and a substantially radially extending end wall at its open end, a frustro-conical counter bore in said socket, said counter bore being axially directed toward the open end of the socket and having a substantially radially extending end wall joining the wall of said axial bore, a split frustro-conical sleeve non-removable mounted in and adapted to rotate in said counter bore, said sleeve being slit from end to end longitudinally along its axis, said sleeve having a portion thereof extending outwardly beyond the end wall of said socket to facilitate its rotation, said sleeve having a cylindrical bore adapted to receive internally said cylindrical member and a radially outwardly projecting shoulder thereon engaging the end wall of said socket, an axially directed peripheral low pitch cammed surface on one of the end walls of said socket, a mating axially directed peripheral cammed surface on said sleeve, the pitch of said mating cammed surface being below the angle of repose of said sleeve in said socket, said socket and said sleeve being so constructed and arranged that when said sleeve is rotated in one direction relative to said socket the sleeve is urged axially in the frustro-conical counter bore of said socket in the direction of reduced diameter by said mating cammed surfaces thereby compressing said sleeve and reducing said longitudinal slit thereby reducing the bore of said sleeve causing the same to grip a cylindrical member placed therein, said sleeve when rotated relative to said socket in the other direction axially separating said mating cammed surface permitting said sleeve to be moved in said counter bore in the direction of increasing diameter thereby releasing the compression on said sleeve and thus increasing the bore of said sleeve to release said cylindrical member therein.

2. The connecting means as specified in claim 1 wherein the cylindrical bore of said sleeve has a plurality of annular ridges for engaging the circumference of said cylindrical member.

References Cited in the file of this patent

UNITED STATES PATENTS

| | | |
|---|---|---|
| 365,387 | Klein | June 28, 1887 |
| 763,236 | Winkler | June 21, 1904 |
| 764,054 | Houdlette | July 5, 1904 |
| 900,917 | Dobson | Oct. 13, 1908 |
| 1,639,315 | Shipley | Aug. 16, 1927 |
| 1,726,809 | Cox | Sept. 3, 1929 |
| 1,736,150 | Dunmire | Nov. 19, 1929 |
| 1,888,539 | Otteson | Nov. 22, 1932 |
| 1,911,659 | Weaver | May 30, 1933 |
| 2,032,416 | Hunt | Mar. 3, 1936 |
| 2,077,869 | Bennett | Apr. 20, 1937 |
| 2,180,209 | Johnson | Nov. 14, 1939 |
| 2,457,648 | Donner | Dec. 28, 1948 |
| 2,531,401 | Clerke | Nov. 28, 1950 |
| 2,681,238 | Chanda | June 15, 1954 |
| 2,761,702 | Noel | Sept. 4, 1956 |
| 2,772,100 | Kreissig | Nov. 27, 1956 |

FOREIGN PATENTS

| | | |
|---|---|---|
| 604,137 | France | Jan. 18, 1926 |